July 28, 1925.

J. W. MYERS

DRAG LINK

Filed July 20, 1923

INVENTOR.

Joseph W. Myers

BY Ralzemond A. Parker

ATTORNEY.

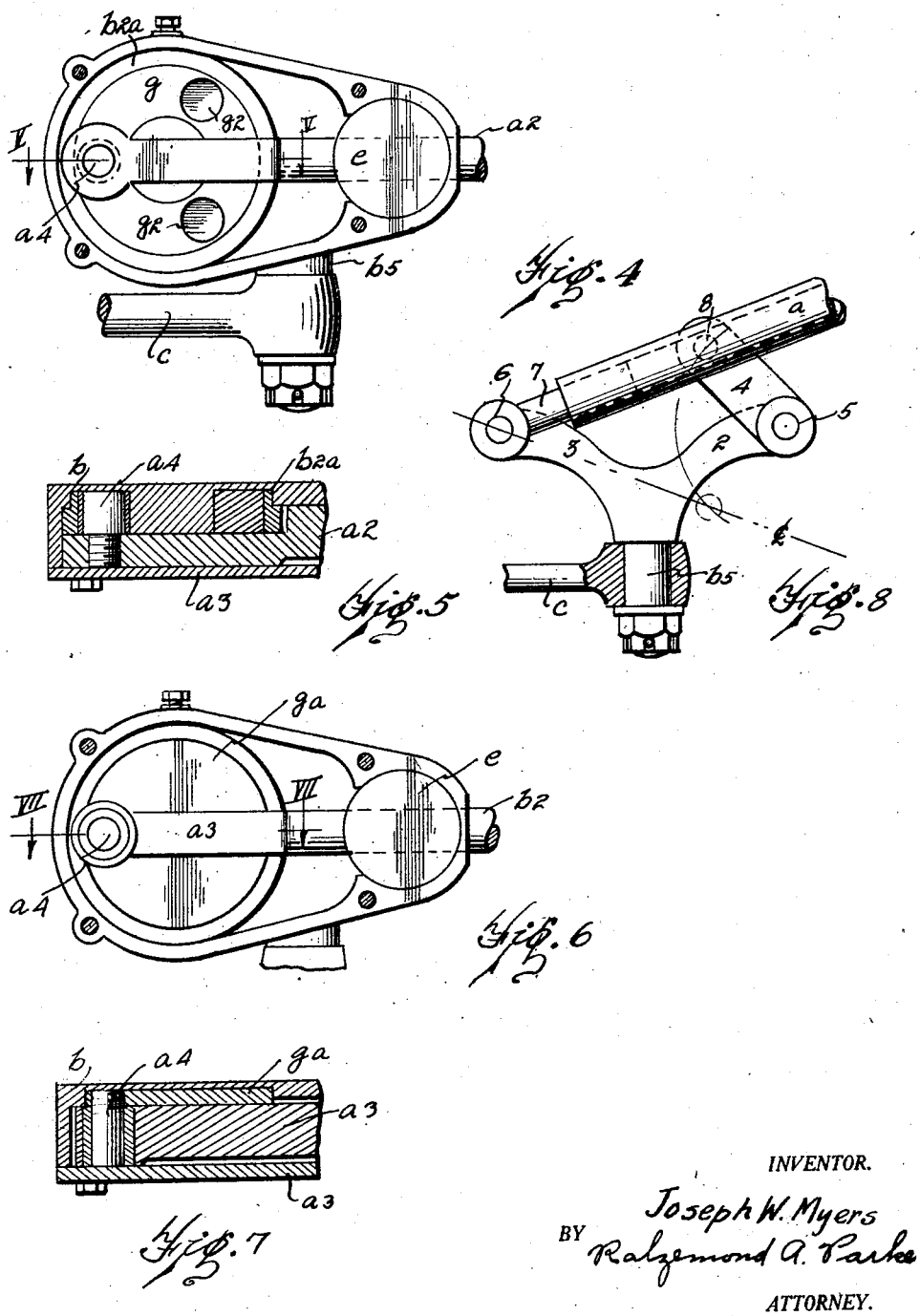

Patented July 28, 1925.

1,547,181

UNITED STATES PATENT OFFICE.

JOSEPH W. MYERS, OF JACKSON, MICHIGAN, ASSIGNOR OF ONE-HALF TO JOSEPH H. MYERS, OF JACKSON, MICHIGAN.

DRAG LINK.

Application filed July 20, 1923. Serial No. 652,685.

*To all whom it may concern:*

Be it known that I, JOSEPH W. MYERS, a citizen of the United States, residing at Jackson, county of Jackson, State of Michigan, have invented a certain new and useful Improvement in Drag Links, and declare the following to be a full, clear, and exact description of the same, such as will enable others skilled in the art to which it pertains to make and use the same, reference being had to the accompanying drawings, which form a part of this specification.

My invention relates to drag link construction for automobiles, and an object of my improvements is to obviate the variation in the distance between the vertical lines through the pivots at the two ends, due to a change in the angular position of the link.

I secure this object in the device illustrated in the accompanying drawing, in which:

Fig. 4 is an elevation, with the side of the casing toward the observer removed, of a modified construction.

Fig. 5 is a section on the line V—V, Fig. 4.

Fig. 6 is a view similar to Fig. 4, showing a second modification.

Fig. 7 is a detail section on the line VII—VII, Fig. 6.

Fig. 8 is an elevation partly in section showing a third modified construction.

$a$ is the drag link consisting of the usual tubular portion and a cylindrical rod $a^2$ forming an extension of the tubular portion toward the knuckle of the front wheel.

$b$ is a casing having a circular bearing $b^2$ therein at the larger end, which is remote from the drag link, and a second bearing $b^4$ (Fig. 2) at its smaller end adjacent to the drag link. The casing $b$ is functionally and substantially a part of the drag link and is so considered in the appended claims.

$d$ is the steering arm pivoted in any usual way to the drag link at the end remote from the wheel.

Figure 1:
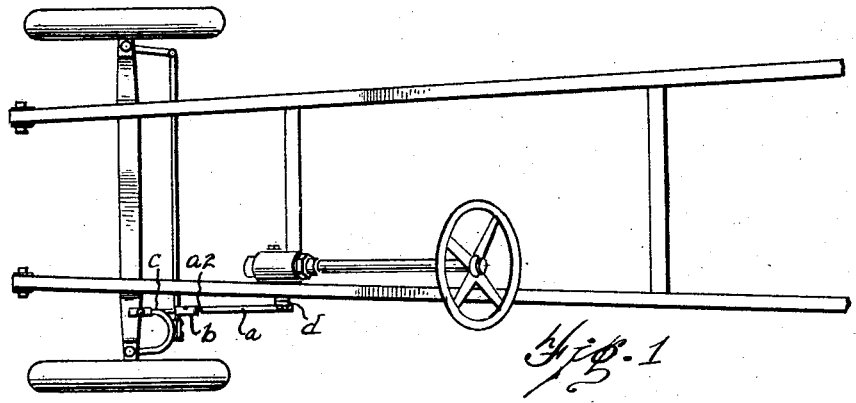
Figure 1 is a plan view of an apparatus embodying my invention and so much of the chassis and running gear of an automobile as is necessary to illustrate its connection therewith.
Figure 2:
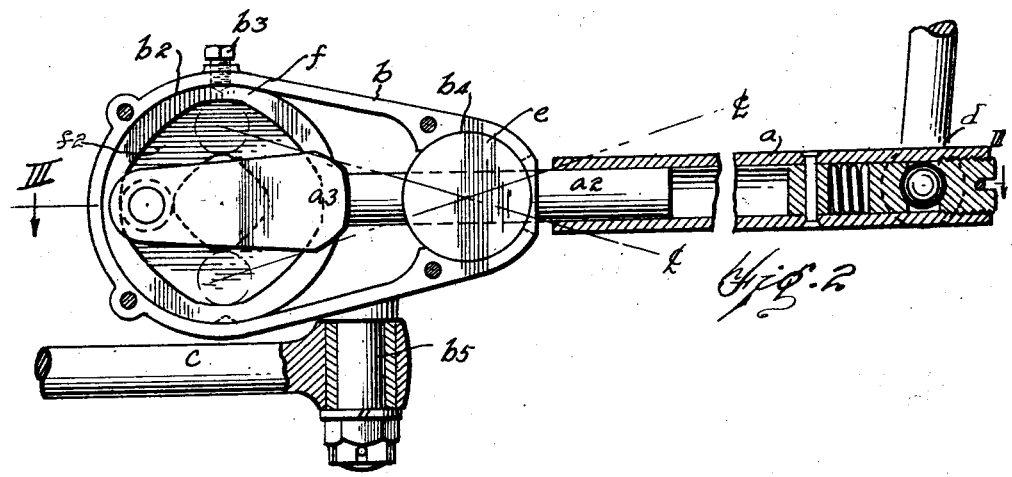
Fig. 2 is an elevation, partly in section and partly broken away, to economize space, the side of the casing toward the observer being removed to show the apparatus contained therein.

$e$ is a cylinder fitted and adapted to rotate in a bearing $b^4$ in the casing $b$. $f$ is a disk adapted to fit and be secured in the bearing $b^2$ in the casing $b$. $b^3$ is a set-screw for fixing the disk $f$ in position. $f^2$ is a groove in the surface of the disk $f$. This groove is parabolic in shape at the left of the vertical line through the center, as shown in Fig. 2.

Figure 3:
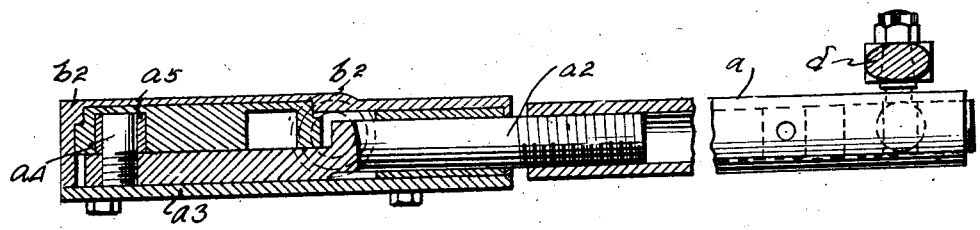
Fig. 3 is a section on the line III—III, Fig. 2.

The rod $a^2$ passes through a diametral aperture through the cylinder $e$ in which it is adapted to reciprocate longitudinally, the casing and walls of the bearing $b^4$ being so formed as to permit of the angular motion of the rod $a^2$ as the cylinder $e$ rotates about its center. The rod $a^2$ is offset and enlarged and strengthened at $a^3$ and passes over the disk $b^2$. $a^4$ is a pin extending at right angles from the end of the rod $a^2$ and engaging in the groove $f^2$. $a^5$ (Fig. 3) is a friction roller around the pin $a^4$ in the groove $f^2$.

The casing $b$ is provided with a cylindrical pivot pin $b^5$ extending vertically from the wall thereof, which pin engages in an eye in the free end of the knuckle arm $c$ and is pivotally secured therein.

The operation of the above described device is as follows:

As the automobile body rises and falls relative to the axle the angular position of the drag link $a$ changes perhaps between the limits indicated by the two center lines in Fig. 2. This change of angular position of the drag link tends to alter the distance between the vertical lines through the centers of the pivots at its two ends. To compensate for this the rod $a^2$ is free to slide longitudinally through the cylinder $e$ and its longitudinal movement is controlled and determined by the engagement of the pin $a^4$ in the slot $f^2$. This slot is so formed that as the pin $a^4$ moves in it the rod $a^2$ is moved a distance just sufficient to correct the change of horizontal distance between the pivotal points of the drag link due to the change of the angular position of said link. Thus if the pivot $d$ descends below its position when the drag link is horizontal the pivotal points of said link would approach each other in a horizontal direction but the pin $a^4$ rising in the upper branch of the slot $f^2$ forces the rod $a^2$ outward and thus substantially lengthens the link so that the horizontal distance between its pivotal points remains constant.

Instead of a parabolic, and accurate, groove $f^2$ a circular groove may be used and a ring $g$ (Fig. 4) fitted therein, the pin $a^4$ in this instance forming a pivotal point between the rod $a^2$ and the ring $g$. When the drag link oscillates the ring $g$ will be caused to slidingly rotate in its groove, causing an approximately equivalent longitudinal movement of the rod $a^2$ to that above described. In Fig. 6 a disk $ga$ is substituted for the ring $g$ similarly adapted to rotate about its center and having the rod $b^2$ pivoted to it in the same way as above described with reference to the ring $g$.

In Fig. 8 instead of the casing $b$ the pin $d^5$ extends upward and is provided with two branches 2 and 3 turning away from each other, presenting pivotal points 5 and 6 at a considerable distance from each other and in the same plane. The rod $a^2$ is replaced by a similar rod 7 which may reciprocate freely in the bore of the tubular portion of the drag link $a$. The outer end of the rod 7 is pivoted at 6 to the branch 3 of the pin $d^5$. 4 is a link pivoted at one end at 5 to the branch 2 of the pin $b^5$ and at its other end pivoted to the drag link $a$. When the pivot of the steering arm that connects it to the drag link moves vertically the drag link oscillates about the pivotal point 6 and the link 4 about the pivotal point 5. Thus the change of angularity of the link 4 compensates for the change of angularity of the drag link and its effective pivotal points remain at a constant distance horizontally from each other.

What I claim is:

1. In a steering mechanism for automobiles, the combination of a steering arm, a knuckle arm, and a drag link pivoted at one end to one of said arms, and at the other end to the other of said arms, and means whereby the angular motion of said link due to the relative vertical motion of said steering arm, shall alter the length of said link between said pivots to maintain a constant horizontal distance between said pivots.

2. In a steering mechanism for automobiles, the combination of a steering arm, a knuckle arm, and a drag link pivoted at one end to one of said arms and at the other end to the other of said arms, a portion of said link being movable in the direction of the length thereof relative to one of said arms, and mechanism connected with an arm adapted to so move said part and adapted to be operated by the angular motion of said link relative to the arm to which it is connected, for the purpose described.

3. In a drag link, the combination of the rod $aa^2$, a casing $b$, a cylinder $e$, in said casing adapted to rotate about its center, said rod slidably passing through said cylinder and a guiding part engaging the end of said rod in said casing and causing the movement of said rod through said cylinder when said rod and cylinder are oscillated.

4. In a steering mechanism for automobiles, the combination of a steering arm, a knuckle arm, a drag link pivoted at one end to one of said arms and at the other to the other of said arms, said link being movable longitudinally relative to one of said arms, and a cam action between said link and said arm adapted to move said link longitudinally with a constrained motion for the purpose described.

5. In a drag link, the combination of the rod $aa^2$, the casing $b$, the cylinder $e$ adapted to rotate in said casing, said casing being provided with a groove $f$, said rod fitting and being adapted to slide through a diametral aperture in the cylinder $e$ and being provided with a part engaging in the groove $f$, for the purpose described.

6. In a steering mechanism for automobiles, the combination of a steering arm, a knuckle arm, and a drag link pivoted at one end to one of said arms, and at the other end to the other of said arms, and means for compensating for the relative movement of said arms, so that said relative movement shall not cause an angular movement of said knuckle arm.

In testimony whereof, I sign this specification.

JOSEPH W. MYERS.